(12) United States Patent
Tawada et al.

(10) Patent No.: US 11,289,999 B2
(45) Date of Patent: Mar. 29, 2022

(54) POWER CONVERSION DEVICE AND POWER CONVERSION SYSTEM

(71) Applicant: TOSHIBA MITSUBISHI-ELECTRIC INDUSTRIAL SYSTEMS CORPORATION, Chuo-ku (JP)

(72) Inventors: Yoshihiro Tawada, Tokyo (JP); Tsuguhiro Tanaka, Tokyo (JP); Masahiro Kinoshita, Tokyo (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 0 days.

(21) Appl. No.: 16/970,416

(22) PCT Filed: Jan. 21, 2019

(86) PCT No.: PCT/JP2019/001683
§ 371 (c)(1),
(2) Date: Aug. 17, 2020

(87) PCT Pub. No.: WO2020/152751
PCT Pub. Date: Jul. 30, 2020

(65) Prior Publication Data
US 2021/0091662 A1    Mar. 25, 2021

(51) Int. Cl.
*H02M 1/32* (2007.01)
*H02M 1/00* (2006.01)
(Continued)

(52) U.S. Cl.
CPC ........... *H02M 1/32* (2013.01); *H02M 7/5395* (2013.01); *H02M 1/0025* (2021.05); *H02M 1/0093* (2021.05)

(58) Field of Classification Search
CPC .... H02M 1/32; H02M 1/0016; H02M 1/0025; H02M 7/487
See application file for complete search history.

(56) References Cited

U.S. PATENT DOCUMENTS 9,178,458 B2 * 11/2015 Yamazaki ........... H02P 21/0003
9,437,888 B2 *  9/2016 Yoshida ............ H01M 8/04925
(Continued)

FOREIGN PATENT DOCUMENTS

JP    2003-9399 A      1/2003
JP    2003009399 A  *  1/2003
(Continued)

OTHER PUBLICATIONS

Machine English translation of JP 2003009399, Inoue Hiromichi, System Interconnected Power Generating System, Jan. 10, 2003 (Year: 2003).*

(Continued)

*Primary Examiner* — Thienvu V Tran
*Assistant Examiner* — Sisay G Tiku
(74) *Attorney, Agent, or Firm* — Oblon, McClelland, Maier & Neustadt, L.L.P.

(57) ABSTRACT

A power conversion device includes: a power conversion circuit for converting DC power into AC power; and a controller to generate a control signal for the power conversion circuit based on a control command value and an output voltage of the power conversion circuit. The controller is configured to generate the control signal based on a corrected voltage command value calculated by subtraction correction to decrease a voltage command value when the output voltage of the power conversion circuit is equal to or higher than a predetermined threshold value, and to generate the control signal based on a voltage command value not subjected to the subtraction correction when the output voltage of the power conversion circuit is lower than the threshold value.

4 Claims, 6 Drawing Sheets

(51) Int. Cl.
H02M 7/487 (2007.01)
H02M 7/5395 (2006.01)

(56) References Cited

U.S. PATENT DOCUMENTS

2007/0223261 A1* 9/2007 Fujii .................. H02M 7/757
 363/55
2016/0204691 A1* 7/2016 Okuda .................. H02M 1/36
 363/55
2017/0297439 A1* 10/2017 An .......................... B60K 6/26
2019/0103808 A1* 4/2019 Yamada .............. H02M 1/4258

FOREIGN PATENT DOCUMENTS

| JP | 2008-283764 A | 11/2008 |
| JP | 2011-67014 A | 3/2011 |
| JP | 2015-122931 A | 7/2015 |

OTHER PUBLICATIONS

Office Action dated Apr. 12, 2021 in corresponding Indian Patent Application No. 202017016704 (with English Translation), 5 pages.
International Search Report dated Mar. 19, 2019 in PCT/JP2019/001683 filed on Jan. 21, 2019, 1 page.
Japanese Office Action dated Jun. 15, 2021 in Japanese Patent Application No. 2020-543834 (with unedited computer generated English translation), 7 pages.
Combined Chinese Office Action and Search Report dated Jul. 9, 2021 in Chinese Patent Application No. 201980006523.8 (with unedited computer generated English translation), 15 pages.

* cited by examiner

F I G. 5
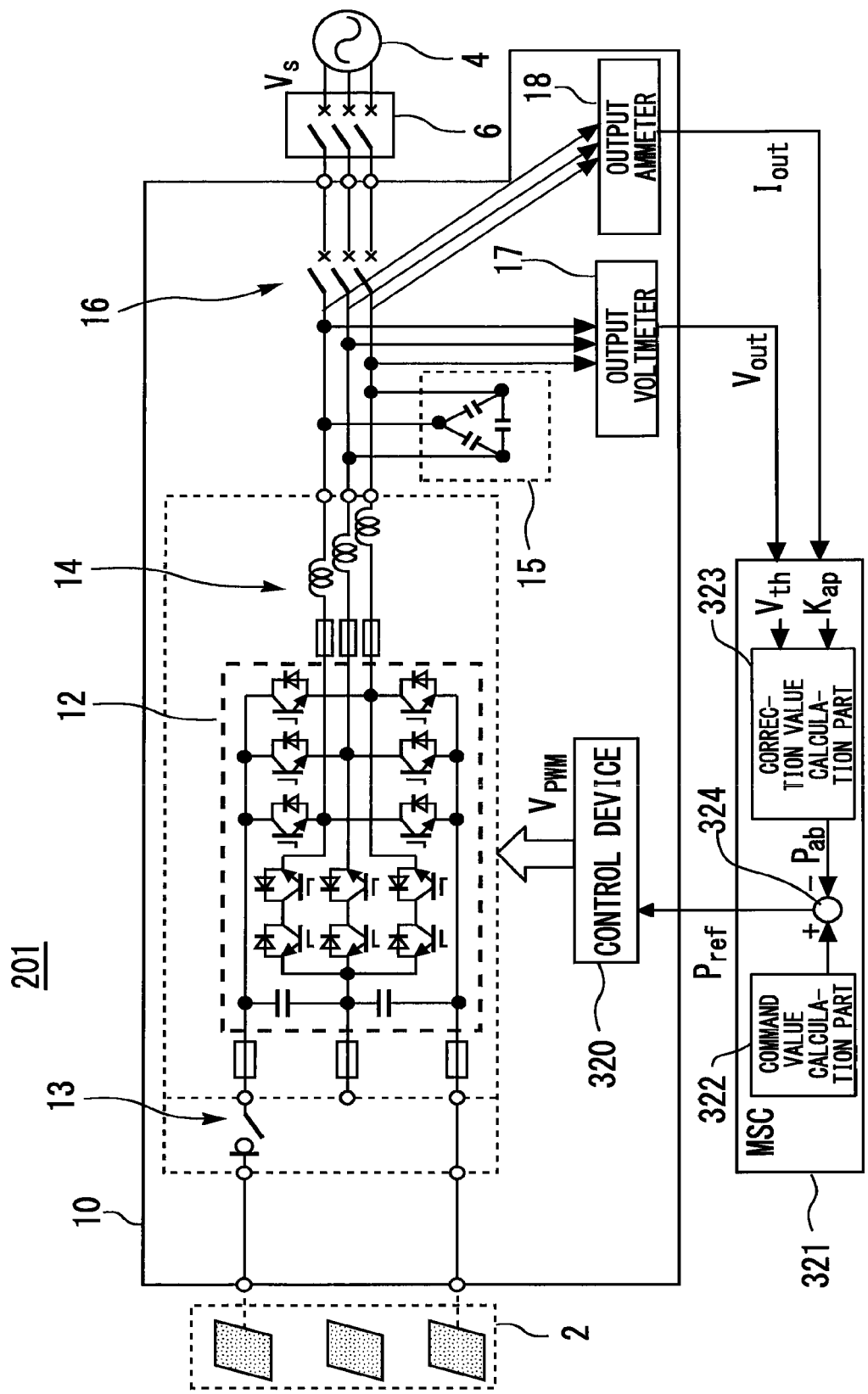

F I G. 6
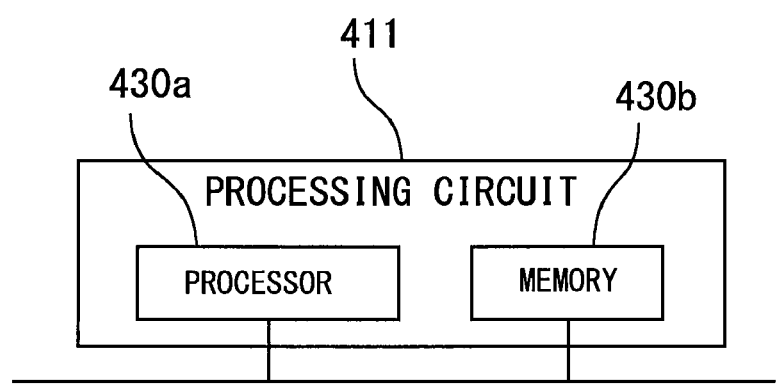

POWER CONVERSION DEVICE AND POWER CONVERSION SYSTEM

TECHNICAL FIELD

The present invention relates to a power conversion device and a power conversion system.

BACKGROUND

Conventionally, as described in, for example, Japanese Patent Application Laid-Open No. 2015-122931, a power conversion device for performing feed forward control based on a grid voltage has been known.

CITATION LIST

Patent Literature

[PTL 1] JP 2015-122931 A

SUMMARY

Technical Problem

In a grid connection system, an abnormal situation in which a power system and a power conversion device are suddenly disconnected is assumed. At the moment when such an abnormal situation occurs, the power conversion device tries to continue to output power as in normal operation. As a result, immediately after the abnormal situation occurs, an output voltage of the power conversion device increases to a steep and abnormal level.

The power conversion device is usually provided with a protection function for an occurrence of an abnormal voltage. By operating the protection function, an abnormal increase in the output voltage of the power conversion device can be eliminated. However, on the other hand, there is a problem that the occurrence of the abnormal voltage cannot be suppressed in a period until the protection function is activated.

The conventional feed-forward control according to the art of the above-mentioned publication is mainly intended to correct control contents of the power conversion device so as to cancel out disturbance. Such a normal feed-forward control is configured such that response speed of a signal filter is set to a somewhat larger degree to avoid a sensitive response to noise or the like, or such that setting of an excessively large gain is prohibited. Because of these design constraints, there has been a problem in that it is difficult for the normal feed-forward control to cope with an abrupt and abnormal level of increase in output voltage caused by the above described abnormality.

The present invention has been made to solve the above-mentioned problems, and an object thereof is to provide a power conversion device and a power conversion system which are improved in order to suppress an abnormal increase in the output voltage of the power conversion device.

Solution to Problem

A power conversion device according to an embodiment of the present application includes:

a power conversion circuit for converting DC power into AC power; and a control device for generating a control signal for the power conversion circuit based on a control command value and an output voltage of the power conversion circuit, wherein the control device is configured to generate the control signal based on a corrected voltage command value calculated by subtraction correction when the output voltage of the power conversion circuit is equal to or higher than a predetermined threshold value, and to generate the control signal based on a voltage command value not subjected to the subtraction correction when the output voltage of the power conversion circuit is lower than the threshold value.

A power conversion system according to an embodiment of the present application includes:

a high-order monitoring device for generating a power control command value; and a power conversion device which includes a power conversion circuit for converting DC power into AC power and a control device for generating a control signal for the power conversion circuit based on the power control command value and an output voltage of the power conversion circuit, wherein the high-order monitoring device is configured to output to the control device a corrected power control command value calculated by subtraction correction to decrease the power control command value when the output voltage of the power conversion circuit is equal to or higher than a predetermined threshold value, and to output to the control device the power control command value not subjected to the subtraction correction when the output voltage of the power conversion circuit is lower than the threshold value.

Advantageous Effects of Invention

According to the power conversion device and the power conversion system, the command value is subjected to subtraction correction only when the output voltage of the power conversion circuit becomes excessively large, and the subtraction correction function can be invalidated when the output voltage of the power conversion circuit is not large. Since the subtraction correction function can be invalidated during a period in which the output voltage is not excessive, the content of the subtraction correction can be freely designed with emphasis on suppressing a rise of the abnormal voltage without being restricted by control contents in a normal state. As a result, an improved power conversion device and power conversion system are provided for suppressing abnormal voltage rise.

BRIEF DESCRIPTION OF DRAWINGS

FIG. 5 is a diagram illustrating a power conversion system according to Embodiment 2.

FIG. 6 is a diagram illustrating an example of a hardware configuration that can be used for a control part in a power conversion device or a power conversion system according to Embodiments 1 and 2.

DESCRIPTION OF EMBODIMENTS

Embodiment 1

Figure 1:
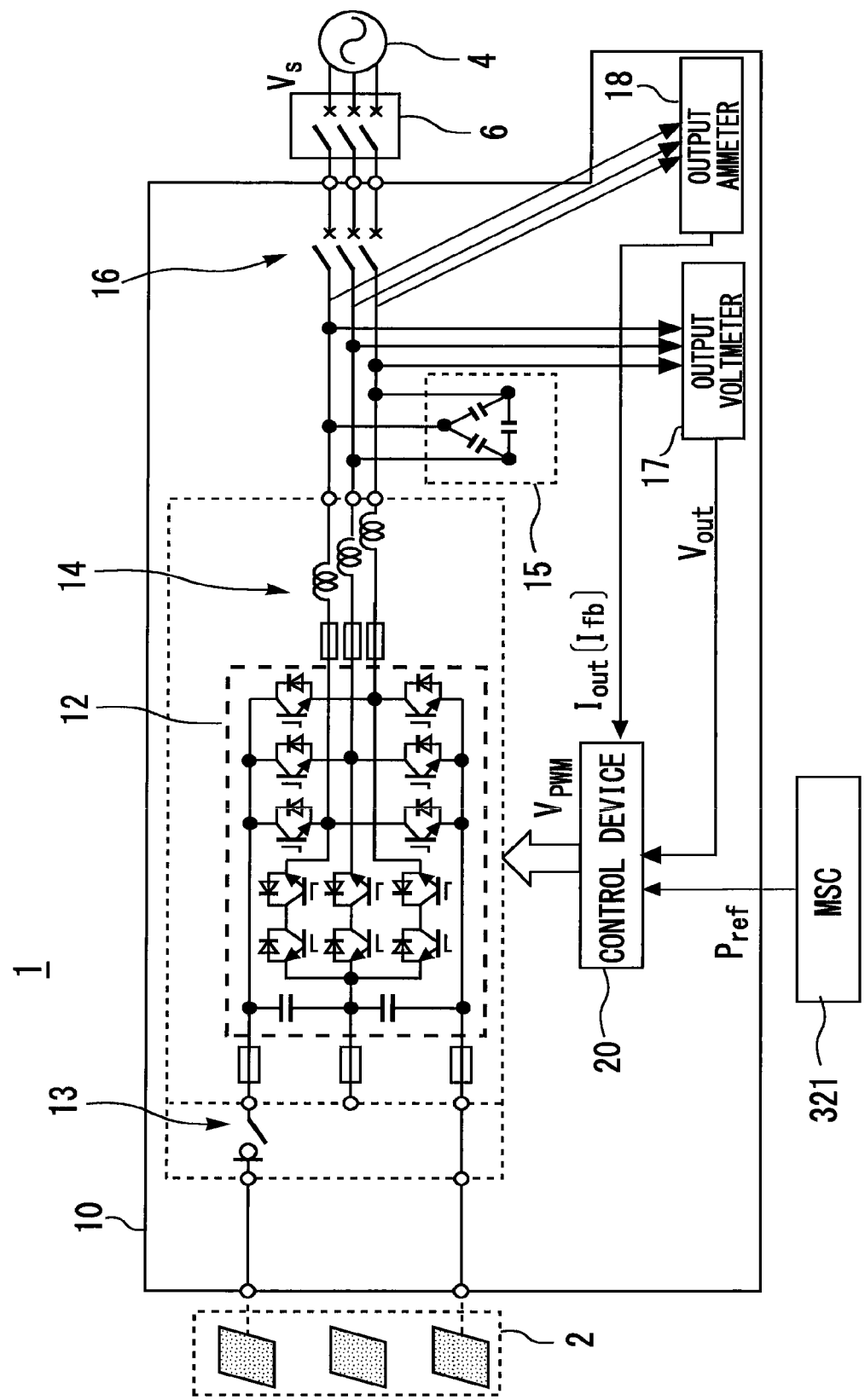
FIG. 1 is a diagram illustrating a power conversion device according to Embodiment 1.

FIG. 1 is a diagram illustrating a power conversion device 10 according to an Embodiment 1. Also shown in FIG. 1 is a power conversion system 1 including a power conversion device 10.

The power conversion system 1 according to Embodiment 1 includes a photovoltaic cell array 2 as an example of a DC power source, a power conversion device 10, and an MSC (Main Site Controller) 321 which is a high-order monitoring device.

The DC power from the photovoltaic cell array 2 is inputted to an input terminal of the power conversion device 10. An output terminal of the power conversion device 10 is connected to an electric power grid 4 via a system-side circuit breaker 6. The MSC 321 provides a power control command value $P_{ref}$ to the power conversion device 10. The electric power grid 4 has a grid voltage $V_S$. When the system-side circuit breaker 6 is in a conducting state, an output voltage $V_{out}$ of the power conversion device 10 coincides with the grid voltage $V_S$.

The power conversion device 10 includes an input-side circuit breaker 13, a power conversion circuit 12 for converting DC power into AC power, an AC reactor 14, a capacitor unit 15, an output-side circuit breaker 16, an output voltmeter 17 for measuring the output voltage $V_{out}$ of the power conversion circuit 12, and a control device 20. The power conversion device 10 also includes an output ammeter 18 for measuring an output current. The value of the output current $I_{out}$ measured by the output ammeter is fed back to the control device 20 as a current feedback value Ifb shown in FIG. 1.

The input-side circuit breaker 13 is inserted in series between the photovoltaic cell array 2 and the power conversion circuit 12. The power conversion circuit 12 includes an inverter circuit configured of a plurality of semiconductor switching elements, and outputs three-phase AC power.

One end of the AC reactor 14 is connected to an output end of the power conversion circuit 12. The other end of the AC reactor 14 is connected to the output-side circuit breaker 16. The capacitor unit 15 is connected in parallel to a wiring which connects the AC reactor 14 to the output-side circuit breaker 16. The output voltmeter 17 measures the output voltage $V_{out}$ of the power conversion circuit 12 by detecting a voltage between the capacitor unit 15 and the output-side circuit breaker 16.

The control device 20 performs control by using a measured value of the output voltage $V_{out}$. In the following explanation, the "measured value of the output voltage $V_{out}$ by the output voltmeter 17" may be simply represented as the "output voltage $V_{out}$" or may be represented as the "value of the output voltage $V_{out}$".

Figure 2:
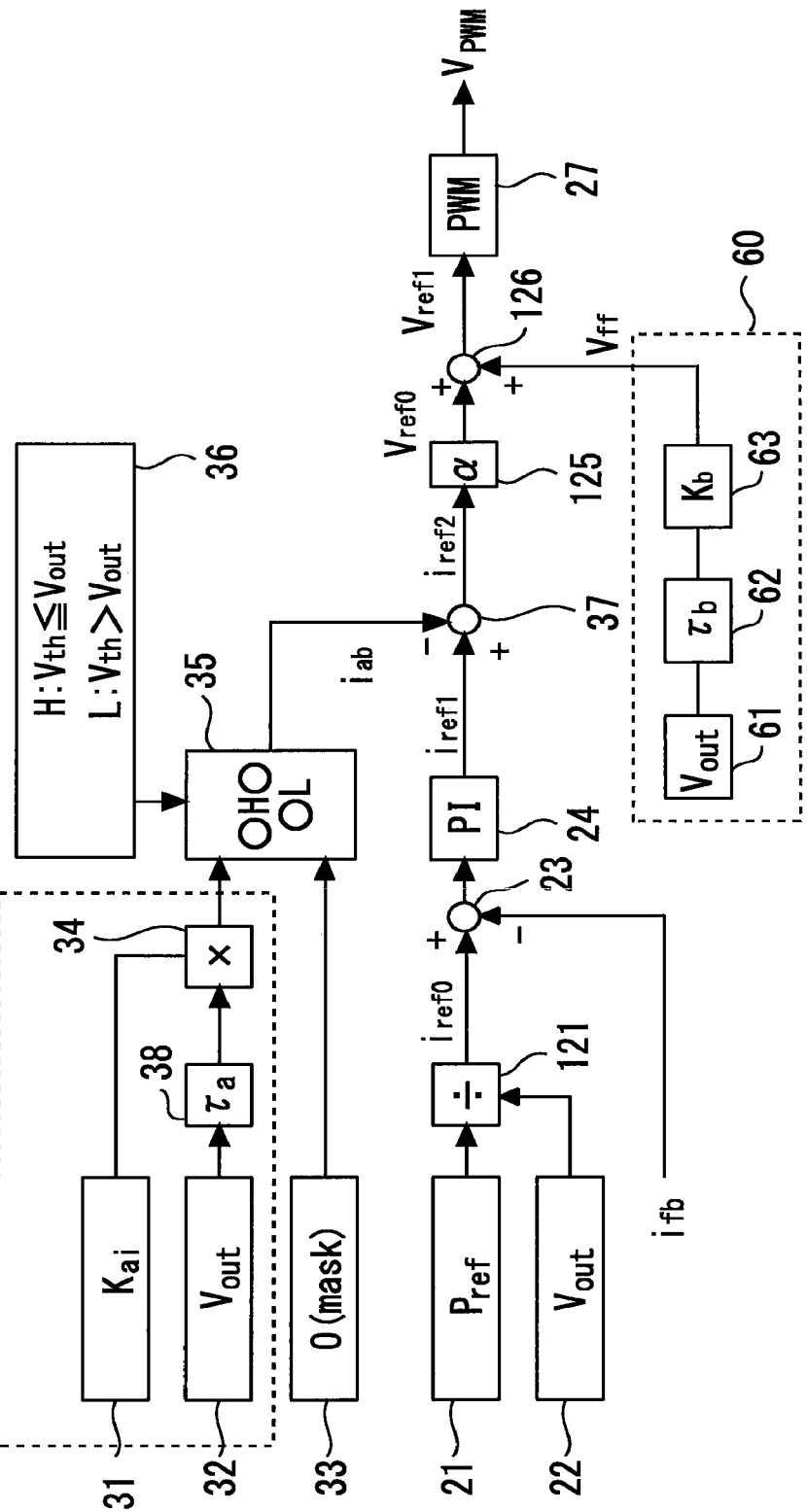
FIG. 2 is a diagram illustrating a control device included in the power conversion device according to Embodiment 1.

FIG. 2 is a diagram illustrating the control device 20 included in the power conversion device 10 according to Embodiment 1. The control device 20 generates PWM signals $V_{PWM}$ for driving the semiconductor-switching elements of the power conversion circuit 12 based on the power control command values $P_{ref}$ and the output voltages $V_{out}$ of the power conversion circuit 12.

The control device 20 includes a power command value acquiring part 21, a first output voltage acquiring part 22, a dividing part 121, a first subtractor 23, and a feedback control part 24. In the embodiment, as an example, the feedback control part 24 is configured to be a proportional-integral control part that performs PI control. However, other feedback control than PI control may be applied.

The power command value acquiring part 21 receives the power control command value $P_{ref}$ from the MSC 321. The first output voltage acquiring part 22 receives the measured value of the output voltage $V_{out}$ from the output voltmeter 17. The dividing part 121 divides the power control command value $P_{ref}$ by the output voltage $V_{out}$ to output a current command value $i_{ref0}$.

The first subtractor 23 outputs a value calculated by subtracting the current feedback value $i_{fb}$ from the current command value $i_{ref0}$. The feedback control part 24 performs proportional-integral control on the output value of the first subtractor 23.

The control device 20 includes a first calculation part 30, a masking part 33, an output switching part 35, a voltage determination part 36, and a second subtractor 37.

The first calculation part 30 includes a first gain part 31 in which a first gain $K_{ai}$ is set, a second output voltage acquiring part 32 which acquires the output voltage $V_{out}$ of the power conversion circuit 12, a first filter part 38 in which the output voltage $V_{out}$ is filtered with a first time constant $\tau_a$, and a multiplier 34 which multiples a value filtered by the first filter part 38 by the first gain $K_{ai}$. The first gain $K_{ai}$ and the first time constant $\tau_a$ are predetermined coefficients.

The first calculation part 30 outputs, as a first correction value $i_{ab}$, a value calculated by multiplying the output voltage $V_{out}$ by the value filtered by the first filter part 38 and the first gain $K_{ai}$.

The first time constant $\tau_a$ is set to be smaller than a second time constant $\tau_a$ of a second calculation part 60 which will be described later. The first time constant $\tau_a$ is set as follows. An abnormal situation is assumed in which the system-side circuit breaker 6 is suddenly opened for some reason and the electric power grid 4 and the power conversion device 10 are suddenly disconnected from each other. Immediately after such an abnormal situation occurs, the output voltage $V_{out}$ of the power conversion device 10 increases sharply and abnormally because the power conversion device 10 tries to retain the output voltage. Values of the first time constants $\tau_a$ are set in advance so that the first filter part 38 passes the steep voltage-rising waveforms.

The voltage determination part 36 switches an output according to a magnitude of the output voltage $V_{out}$ of the power conversion circuit 12. That is, when the output voltage $V_{out}$ of the power conversion circuit 12 is equal to or higher than a threshold value $V_{th}$, the voltage determination part 36 outputs a value of "1" as a first output. When the output voltage $V_{out}$ of the power conversion circuit 12 is lower than the threshold value $V_{th}$, the voltage determination part 36 outputs a value of "0" as a second output.

The output switching part 35 transmits a first correction value $i_{ab}$ to the second subtractor 37 when the voltage determination part 36 generates the first output. On the other hand, when the voltage determination part 36 generates the second output, the output switching part 35 masks the first correction value $i_{ab}$ with a mask value which is set in the masking part 33. In the embodiment, the mask value of the masking part 33 is set to zero. When the mask is applied, the output switching part 35 transmits zero to the second subtractor 37.

The second subtractor 37 receives from the output switching part 35 either zero or the first correction value $i_{ab}$. When the second subtractor 37 receives the first correction value $i_{ab}$ from the output switching part 35, the first correction value $i_{ab}$ is subtracted from the current command value $i_{ref1}$ which is a value for calculating a voltage command value $V_{ref0}$.

With the above configuration, when the output voltage $V_{out}$ of the power conversion circuit 12 is equal to or higher than the threshold value $V_{th}$, the control device 20 subtracts the first correction value $i_{ab}$ from the current command value $i_{ref1}$. This makes it possible to perform subtraction correction on the voltage command values $V_{ref0}$.

The control device 20 includes a coefficient calculation part 125, an adder 126, and a PWM signal generating part 27 that generates a PWM signal $V_{PWM}$.

The coefficient calculation part 125 multiplies a corrected current command value $i_{ref2}$ outputted from the second subtractor 37 by a predetermined calculation coefficient α to calculate the voltage command value $V_{ref0}$. The adder 126 calculates a voltage command value $V_{ref1}$ by adding a second correction value $V_{ff}$ from the second calculation part 60 to the voltage command value $V_{ref0}$. The PWM signal generating part 27 calculates the PWM signal $V_{PWM}$, which is a gate-driving signal of the power conversion circuit 12, based on the voltage command $V_{ref1}$.

The control device 20 includes the second calculation part 60. The second calculation part 60 includes a third output voltage acquiring part 61 for acquiring the output voltage $V_{out}$ of the power conversion circuit 12, a second filter part 62 having a second time constant $\Sigma_b$, and a second gain part 63 in which a second gain $K_b$ is set. The second gain $K_b$ and the second time constant $\tau_b$ are predetermined values.

The second calculation part 60 is configured to calculate a value by filtering the output voltage $V_{out}$ of the power conversion circuit 12 with the second time constant $\tau_b$ by using the second filter part 62, and to multiply the value by the second gain $K_b$. The second calculation part 60 outputs the second correction value $V_{ff}$ calculated by multiplying the output voltage $V_{out}$ of the power conversion circuit 12 by the predetermined second gain $K_b$.

The second gain $K_b$ is set in advance to a value differing from the first gain $K_{ai}$ described above. Specifically, in Embodiment 1, the first gain $K_{ai}$ and the second gain $K_b$ are set in advance so that a voltage subtraction amount corresponding to the subtraction correction of the first correction value $i_{ab}$ becomes larger than the second correction value $V_{ff}$.

The second calculation part 60 inputs the second correction value $V_{ff}$, which is a voltage-feed-forward correction value, to the adder 126. Unlike the first correction value $i_{ab}$, the second correction value $V_{ff}$ is inputted to the adder 126 regardless of whether the output voltage $V_{out}$ of the power conversion circuit 12 is equal to or higher than the threshold value $V_{th}$. Regardless of whether or not the output voltage $V_{out}$ of the power conversion circuit 12 is equal to or higher than the threshold value $V_{th}$, the control device 20 corrects the voltage command value $V_{ref0}$ with the second correction value $V_{ff}$.

As described above, when the output voltage $V_{out}$ of the power conversion circuit 12 is equal to or higher than the predetermined threshold value $V_{th}$, the control device 20 can perform the subtraction correction using the first correction value $i_{ab}$ so as to reduce the output voltage command value $V_{ref0}$. On the other hand, when the output voltage $V_{out}$ of the power conversion circuit 12 is lower than the threshold value $V_{th}$, the control device 20 does not perform the subtraction correction on the voltage command value $V_{ref0}$.

Therefore, according to the power conversion device 10 of Embodiment 1, the voltage command value $V_{ref0}$ can be subjected to the subtraction correction only when the output voltage $V_{out}$ of the power conversion circuit 12 becomes excessively large, and the subtraction correction function can be invalidated when the output voltage $V_{out}$ of the power conversion circuit 12 is not large.

Since the subtraction correction function can be invalidated while the output voltage $V_{out}$ is not excessively large, various specifications of the subtraction correction function of the control device 20 can be freely and boldly designed from the viewpoint of suppressing an increase in the abnormal voltage. This makes it possible to mount the subtraction correction function suitable for suppressing the increase in the abnormal voltage.

In the power conversion device 10 according to Embodiment 1, the first gain $K_{ai}$ and the second gain $K_b$ are set in advance.

The second calculation part 60 performs normal feed-forward control which operates in addition to when the output voltage $V_{out}$ is abnormal. According to Embodiment 1, the gain is set in advance so that the subtraction correction of the first calculation part 30 is performed with a large gain as compared with the normal feed-forward control.

Since the first calculation part 30 is invalidated in a normal state (that is, in a $V_{th}>V_{out}$ state), it is possible to reliably prevent the first calculation part 30 from erroneously performing excessive subtraction correction. On the other hand, since large subtraction correction can be performed by the first calculation part 30 when a voltage abnormality occurs, correction for suppressing the abnormal voltage can be reliably achieved.

The power conversion device 10 according to Embodiment 1 has a preferable configuration in which the first time constant $\tau_a$ is set smaller than the second time constant $\tau_b$ in advance. As a result, the following preferable effects can be achieved.

While it is preferable that noise and the like be excluded as much as possible from the processing of the second calculation part 60, it is preferable that the processing of the first calculation part 30 instantaneously respond to a sharp voltage change. From this viewpoint, the filter response speeds of the first calculation part 30 and the second calculation part 60 are different from each other.

Since the second calculation part 60 is used for the normal feed-forward control which operates even within a normal range of the output voltage $V_{out}$, the second calculation part 60 needs to prevent the output voltage from becoming excessively sensitive to voltage noises. Therefore, the second time constants $\tau_b$ should be a large value to some extent so as not to pick up signal noises or the like.

However, since the first calculation part 30 is for performing an emergency countermeasure at the time of a voltage abnormality, it is important that the first calculation part 30 is more sensitive to a steep voltage change rather than a noise removal. In order to appropriately respond to an abnormal increase in the output voltage $V_{out}$ that occurs when the power conversion device 10 is shut off from an electric power grid, it is required to set the filtering time constants to such an extent that the abnormal increase in the output voltage $V_{out}$ can be reliably detected. For example, it is preferable to set the first time constants $\tau_a$ in advance to such a value that a steep voltage-rising waveform to be changed in the order of several milliseconds can be surely passed through.

Hereinafter, a modification of Embodiment 1 will be described with reference to FIGS. 3 and 4. The following description focuses on the differences from Embodiment 1, and the description of the common points is omitted or simplified. In addition, the same reference signs are assigned to the same or corresponding components between the above-mentioned Embodiment 1 and the following modified examples in the drawings, and description thereof is omitted.

Figure 3:
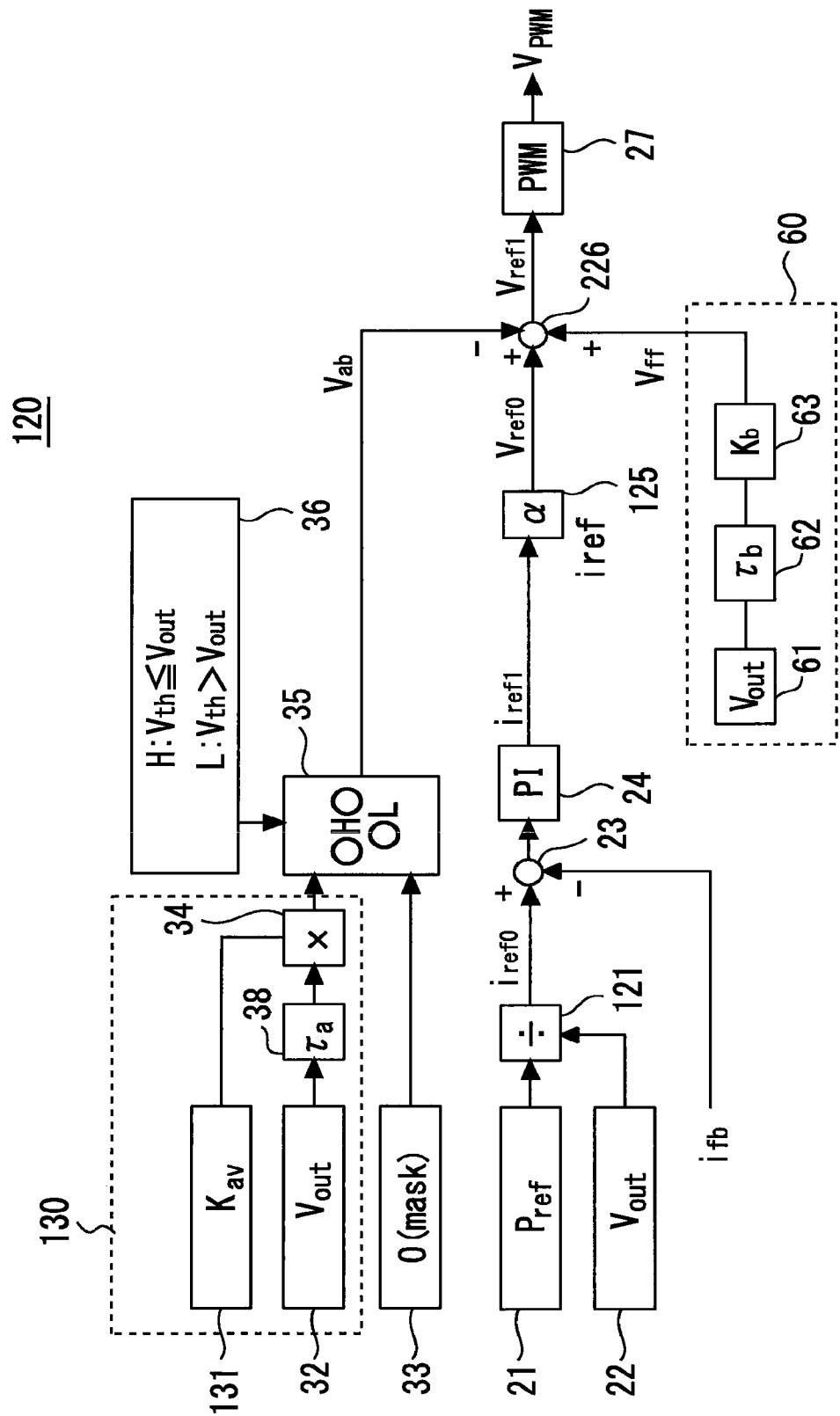
FIG. 3 is a diagram illustrating a control device provided in a power conversion device according to a modification of Embodiment 1.

FIG. 3 is a diagram illustrating a control device 120 included in a power conversion device according to a modification of Embodiment 1. The control device 120 according to the modification of FIG. 3 can be applied to the power conversion device 10 of FIG. 1 instead of the control device 20 of FIG. 2. The control device 120 differs from the control device 20 in that the control device 120 includes a first calculation part 130 instead of the first calculation part 30, does not include a second subtractor 37, and includes an adder-subtractor 226 instead of the adder 126.

The control device 120 includes the first calculation part 130. The first calculation part 130 calculates the first correction value $i_{ab}$ based on the output voltage $V_{out}$ of the power conversion circuit 12 and a first gain value $K_{av}$. The first gain $K_{av}$, which is a predetermined coefficient, is set in a first gain part 131 of the first calculation part 130.

When the output voltage $V_{out}$ of the power conversion circuit 12 is equal to or higher than the threshold value $V_{th}$, the control device 120 performs subtraction correction by subtracting a first correction value $V_{ab}$ from the voltage command value $V_{ref0}$. The adder-subtractor 226 receives the first correction value $V_{ab}$ transmitted from the output-switching part 35. The adder-subtractor 226 subtracts the first correction value $V_{ab}$ from the voltage command value $V_{ref0}$.

In the modification shown in FIG. 3, the first correction value $V_{ab}$ is a voltage-correction value. The control device 120 executes subtraction control to the voltage command value $V_{ref0}$ based on the output voltage $V_{out}$ of the power conversion circuit 12. Both the first gain $K_{av}$ and the second gain $K_b$ are coefficients for voltages. The first gain $K_{av}$ and the second gain $K_b$ may be set to different values, for example, the first gain $K_{av}$ may be set to a value larger than the second gain $K_b$, and conversely, the first gain $K_{av}$ may be set to a value smaller than the second gain $K_b$.

Figure 4:
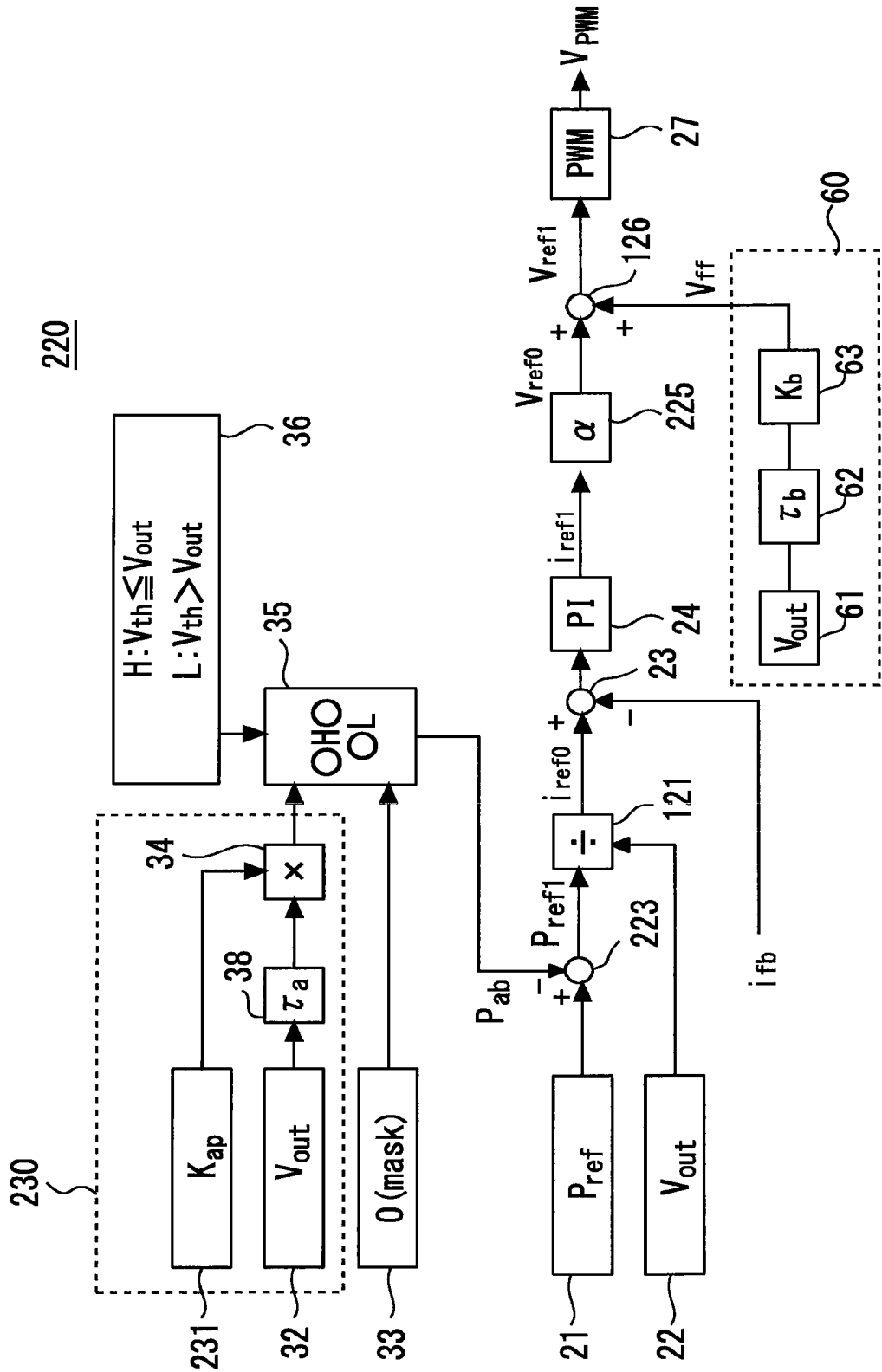
FIG. 4 is a diagram illustrating a control device provided in a power conversion device according to a modification of Embodiment 1.

FIG. 4 is a diagram illustrating a control device 220 included in a power conversion device according to a modification of Embodiment 1. The control device 220 according to the modification in FIG. 4 can be applied to the power conversion device 10 of FIG. 1 instead of the control device 20 in FIG. 2. The control device 220 differs from the control device 20 in that the control device 220 includes a first calculation part 230 instead of the first calculation part 30, does not include the second subtractor 37, includes a third subtractor 223, and includes a coefficient calculation part 225 instead of the coefficient calculation part 125.

The control device 220 includes the first calculation part 230. The first calculation part 230 calculates a first correction value $P_{ab}$ based on the output voltage $V_{out}$ of the power conversion circuit 12 and a first gain value $K_{ap}$. The first gain $K_{ap}$, which is a predetermined coefficient, is set in a first gain part 231 of the first calculation part 230.

When the output voltage $V_{out}$ of the power conversion circuit 12 is equal to or higher than the threshold value $V_{th}$, the control device 220 subtracts the first correction value $P_{ab}$ from the power control command value $P_{ref}$ which is a value for calculating the voltage command value $V_{ref0}$. More specifically, the third subtractor 223 receives the first correction value $P_{ab}$ transmitted from the output switching part 35, and this achieves calculation to subtract the first correction value $P_{ab}$ from the power control command value $P_{ref}$ which is the value for calculating the voltage command value $V_{ref0}$.

A corrected power command value $P_{ref1}$ which is subtracted the first correction value $P_{ab}$ is inputted to the dividing part 121. Thereafter, the same processing as that of the control device 20 of FIG. 2 is performed. This achieves subtraction correction on the voltage command value $V_{ref0}$.

In the modification shown in FIG. 4, the first correction value $P_{ab}$ is a power correction value. The control device 220 performs subtraction control to the power control command value $P_{ref}$ based on the output voltage $V_{out}$ of the power conversion circuit 12. The method of subtraction processing differs from that of the control devices 20 and 120 in that the power control command value is subjected to subtraction.

As described above, the control device 20 shown in FIG. 2 according to Embodiment 1 and the control devices 120 and 220 according to the modification thereof can perform the subtraction correction on the voltage command value $V_{ref0}$ by subtracting the first correction values $i_{ab}$, $V_{ab}$, $P_{ab}$ from the current command value $i_{ref1}$, the voltage command value $V_{ref0}$, or the power control command value $P_{ref}$. It should be noted that when the subtraction correction is performed in the control devices 20 and 120 according to FIGS. 2 and 3, the subtraction correction is characterized in that the value calculated by multiplying the current command value by the voltage command value becomes smaller than the value of the power control command value $P_{ref}$.

The control device 20, 120, 220 may be configured, for example, as follows. The first gains $K_{ai}$, $K_{av}$, $K_{ap}$ may be preset to perform significant subtraction corrections to reduce the output voltage $V_{out}$ or the output power to a sufficiently low level, such as 10% or less of rated power. The control devices 20, 120, 220 may be configured such that the output voltage $V_{out}$ is subtracted beyond a normal feed-forward control fluctuation range.

When the power conversion circuit 12 is provided with a protection stop function being operated when a voltage abnormality is detected, the control devices 20, 120, and 220 may be configured to operate the subtraction correction sufficiently earlier than the protection stop function is operated.

Embodiment 2

FIG. 5 is a diagram illustrating a power conversion system 201 according to Embodiment 2. The power conversion system 201 includes the power conversion device 10 and a MSC 321 which is a high-order monitoring system. The power conversion device 10 according to the Embodiment 2 includes a control device 320 instead of the control device 20.

The control device 320 is obtained by removing the first calculation part 30, the masking part 33, the output switching part 35, and the voltage determination part 36 from the control device 20 shown in FIG. 2. The MSC 321 includes a command value calculation part 322, a correction value calculation part 323, and a fourth subtractor 324. In these points, Embodiment 2 is different from Embodiment 1.

The fourth subtractor 324 subtracts the first correction value $P_{ab}$ calculated by the correction value calculation part 323 from the $P_{ref}$ generated by the command value calculation part 322. When the output voltage $V_{out}$ of the power conversion circuit 12 is equal to or higher than the predetermined threshold value $V_{th}$, the correction value calculation part 323 outputs a value calculated by multiplying the predetermined first gain $K_{ap}$ by the output power $P_{out}$ of the power conversion circuit 12 as the first correction value $P_{ab}$. The output power $P_{out}$ of the power conversion circuit 12 is calculated by multiplying the output voltage $V_{out}$ by the output current $I_{out}$.

Therefore, when the output voltage $V_{out}$ of the power conversion circuit 12 is equal to or higher than the predetermined threshold value $V_{th}$, the MSC 321 performs subtraction correction on the power control command value $P_{ref}$ to reduce the power control command value $P_{ref}$. The MSC 321 outputs a corrected power control command value $P_{ref}$ to the control device 320.

On the other hand, when the output voltage $V_{out}$ of the power conversion circuit 12 is lower than the predetermined threshold value $V_{th}$, the correction value calculation part 323 outputs zero. Therefore, when the output voltage $V_{out}$ of the power conversion circuit 12 is lower than the threshold value $V_{th}$, the MSC 321 outputs the power control command value $P_{ref}$ to the control device 320 without performing the subtraction correction.

That is, in the Embodiment 2, functions of the first calculation part 230, the masking part 33, the output switching part 35, and the voltage determination part 36 in Embodiment 1 are replaced with the correction value calculation part 323.

According to the power conversion system 201 of the Embodiment 2, the power control command value $P_{ref0}$ is subjected to the subtraction correction only when the output voltage $V_{out}$ of the power conversion circuit 12 becomes excessively large, and the subtraction correction function can be invalidated when the output voltage $V_{out}$ of the power conversion circuit 12 is not large.

Since the subtraction correction function can be invalidated during periods when the output voltage $V_{out}$ is not excessive, various specifications of the subtraction correction function can be freely designed from the viewpoint of suppressing an increase in the abnormal voltage. This makes it possible to mount subtraction correction function suitable for suppressing the increase in the abnormal voltage.

The subtraction-correction control function provided in the control devices 20, 120, 220 according to Embodiment 1 or the MCS 321 according to the Embodiment 2 may be configured by any one of an analogue circuit, a digital circuit, and combinations thereof. In a case where the digital circuit is used, more specifically, the subtraction correction control function may be configured by dedicated hardware, or the subtraction correction control function may be configured by programming implementation on general-purpose hardware such as a microcomputer or the like.

FIG. 6 is a diagram illustrating an example of a hardware configuration that can be used for a control part in the power conversion device or the power conversion system according to Embodiments 1 and 2.

The control devices 20, 120, 220 according to Embodiment 1 or the MCS 321 according to the Embodiment 2 may be configured by the hardware-structure of the control unit 411 shown in FIG. 6. Each function of the control unit 411 may be implemented by a processing circuit. The processing circuit includes a processor 430a and a memory 430b.

For example, the processor 430a is a CPU (Central Processing Unit) such as a central processing unit, a processing unit, a microprocessor, a microcomputer, or a processor.

For example, the memory 430b is a nonvolatile or volatile semiconductor memory such as a RAM, a ROM, a flash memory, an EPROM, EEPROM, or the like, or is a magnetic disk, a flexible disk, an optical disk, a compact disk, a mini disk, or a DVD.

Part or all of control contents performed by the control devices 20, 120, 220 according to Embodiment 1 or the MCS 321 according to the Embodiment 2 may be stored in the memory 430b in the form of control programs. In this case, in the processing circuit, a program stored in the memory 430b is executed by the processor 430a.

REFERENCE SIGNS LIST 1, 201 Power conversion system
2 photovoltaic cell array (DC power supply)
4 Electric power grid
6 System-side circuit breaker
10 Power conversion device
12 Power conversion circuit
13 Input-side circuit breaker
14 AC reactor
15 Capacitor unit
16 Output-side circuit breaker
17 Output voltmeter
20, 120, 220, 320 Control device
21 Power command value acquiring part
22 First output voltage acquiring part
23 First subtractor
24 Proportional integral control part
27 PWM signal generating part
30, 130, 230 First calculation part
31, 131, 231 First gain part
32 Second output voltage acquiring part
33 Masking part
34 Multiplier
35 Output switching part
36 Voltage determination part
37 Second subtractor
38 First filter part
60 Second calculation part
61 Third output voltage acquiring part
62 Second filter part
63 Second gain part
121 dividing part
125 Coefficient calculation part
126 Adder
223 Third subtractor
226 Adder-subtractor
322 Command value calculation part
323 Correction value calculation part
324 Fourth subtractor
411 Control unit
430a Processor
430b Memory
$i_{ab}$, $V_{ab}$, $P_{ab}$ First correction value
$V_{ff}$ Second correction value
$i_{fb}$ Current feedback value
$K_{ai}$, $K_{ap}$, $K_{av}$ First gain
$K_b$ Second gain
$P_{ref}$ Power control command value
$V_{out}$ Output voltage
$i_{ref0}$, $i_{ref1}$, $i_{ref2}$ Current command value
$V_{ref0}$, $V_{ref1}$ Voltage command value
$V_S$ Grid voltage
$V_{th}$ Threshold value
$\tau_a$ First time constant
$\tau_b$ Second time constant

The invention claimed is:

1. A power conversion device comprising:
a power conversion circuit for converting DC power into AC power; and
a control device for generating a control signal for the power conversion circuit based on a voltage command value,
wherein the control device is configured
to generate the control signal based on a corrected voltage command value calculated by subtraction correction when an output voltage of the power conversion circuit is equal to or higher than a predetermined threshold value, the subtraction correction subtracting from the voltage command value a correction value calculated based on the output voltage of the power conversion circuit, and
to generate the control signal based on the voltage command value not subjected to the subtraction correction when the output voltage of the power conversion circuit is lower than the threshold value,
wherein the control device includes a first calculation part that calculates a first correction value based on the output voltage of the power conversion circuit and a first gain, the first gain is a predetermined coefficient, and
wherein the control device is configured to perform the subtraction correction on the voltage command value by subtracting the first correction value from the voltage command value, a current command value for calculating the voltage command value, or a power command value for calculating the voltage command value when the output voltage of the power conversion circuit is equal to or higher than the threshold value.

2. The power conversion device according to claim 1, wherein the control device includes a second calculation part for outputting a second correction value calculated by multiplying the output voltage of the power conversion circuit by a predetermined second gain, and
wherein the control device is configured to correct the voltage command value with the second correction value regardless of whether or not the output voltage of the power conversion circuit is equal to or higher than the threshold value.

3. The power conversion device according to claim 2, wherein the first calculation part is configured to multiply by the first gain a value outputted by filtering with a first time constant the output voltage of the power conversion circuit, wherein the second calculation part is configured to multiply by the second gain a value outputted by filtering with a second time constant the output voltage of the power conversion circuit, and wherein the first time constant is set smaller than the second time constant.

4. A power conversion system comprising:

a high-order monitoring device for generating a power control command value, and a power conversion device which includes a power conversion circuit for converting DC power into AC power and a control device for generating a control signal for the power conversion circuit based on the power control command value and an output voltage of the power conversion circuit, wherein the high-order monitoring device is configured to output to the control device a corrected power control command value calculated by subtraction correction for decreasing the power control command value when the output voltage of the power conversion circuit is equal to or higher than a predetermined threshold value, the subtraction correction subtracting from the power control command value a correction value calculated based on the output voltage of the power conversion circuit, and to output to the control device the power control command value to which the subtraction correction is not performed when the output voltage of the power conversion circuit is lower than the threshold value, wherein the control device includes a first calculation part that calculates a first correction value based on the output voltage of the power conversion circuit and a first gain, the first gain is a predetermined coefficient, and wherein the control device is configured to perform the subtraction correction on the power control command value by subtracting the first correction value from the power control command value, a current command value for calculating the power control command value or a power command value for calculating the voltage command value when the output voltage of the power conversion circuit is equal to or higher than the threshold value.

* * * * *